United States Patent [19]
Yap et al.

[11] Patent Number: 5,353,468
[45] Date of Patent: Oct. 11, 1994

[54] VACUUM CLEANER COMPRISING A SUCTION TUBE AND SUCTION TUBE PROVIDED WITH A REMOTE-CONTROL CIRCUIT COMPRISING A CAPACITIVE SENSOR

[75] Inventors: Kok K. Yap; Boon C. Ler; Swee G. Lim, all of Singapore, Singapore

[73] Assignee: U.S. Philips Corporation, New York, N.Y.

[21] Appl. No.: 959,812

[22] Filed: Oct. 13, 1992

[30] Foreign Application Priority Data

Oct. 17, 1991 [EP] European Pat. Off. ........ 91202696.0
Aug. 12, 1992 [EP] European Pat. Off. ........ 92202488.0

[51] Int. Cl.$^5$ ............................................. A47L 9/28
[52] U.S. Cl. ......................................... 15/319; 15/339
[58] Field of Search ............... 15/339, 412, 319; 341/33; 200/600

[56] References Cited

U.S. PATENT DOCUMENTS

| | | | |
|---|---|---|---|
| 4,531,287 | 7/1985 | Shibata et al. | 200/600 |
| 4,672,229 | 6/1987 | Skarman et al. | 200/600 |
| 5,036,321 | 7/1991 | Leach et al. | 341/33 |

FOREIGN PATENT DOCUMENTS

| | | |
|---|---|---|
| 0430478 | 6/1991 | European Pat. Off. . |
| 3511666 | 10/1986 | Fed. Rep. of Germany ........ 15/339 |
| 58-009020 | 1/1983 | Japan . |
| 61-169752 | 7/1986 | Japan . |
| 1277527 | 1/1990 | Japan . |
| 3264032 | 11/1991 | Japan . |

Primary Examiner—David A. Scherbel
Assistant Examiner—Reginald L. Alexander
Attorney, Agent, or Firm—Ernestine C. Bartlett

[57] ABSTRACT

A vacuum cleaner is provided which comprises a housing (100) provided with an electric motor (110) and with an electronic circuit (120) for controlling the electric motor (110), and a suction tube (200) coupled to the housing (100) and comprising a grip (210) with a remote control circuit (220) for controlling the electronic circuit (120), which control circuit (220), in order to provide ease of operation without any disturbances, comprises a capacitive sensor (CS) for detecting the presence of a part of a human body in the proximity of the grip (210), which detection enables the electronic circuit (120) to be controlled by the remote control circuit (220).

12 Claims, 3 Drawing Sheets

VACUUM CLEANER COMPRISING A SUCTION TUBE AND SUCTION TUBE PROVIDED WITH A REMOTE-CONTROL CIRCUIT COMPRISING A CAPACITIVE SENSOR

FIELD OF THE INVENTION

The invention relates to a vacuum cleaner comprising a housing provided with an electric motor and with an electronic circuit for controlling the electric motor, and a suction tube coupled to the housing and comprising a grip with a remote control circuit for controlling the electronic circuit.

The invention also relates to a suction tube for use with a vacuum cleaner comprising a housing provided with an electric motor and with an electronic circuit for controlling the electric motor, which suction tube comprises a grip with a remote control circuit for controlling the electronic circuit.

Such a vacuum cleaner can be used inter alia for domestic purposes and such a suction tube is suitable for use in conjunction with a vacuum cleaner of the said type.

BACKGROUND OF THE INVENTION

Such a vacuum cleaner and such a suction tube are known, inter alia from the Japanese Patent Application bearing the application number 63-106340. The vacuum cleaner described in said Japanese Patent Application comprises a suction tube with an optical unit which forms part of the remote control circuit, which optical unit is adapted to detect whether a user of a vacuum cleaner is holding the grip in a hand. For detecting the hand the optical unit comprises a light-emitting part and a light-receiving part, a light beam generated by the light-emitting part and detected by the light-receiving part being interrupted by the hand of a user of the vacuum cleaner. The remote control circuit controls the electronic circuit in response to the detection of the hand, the electric motor being switched on when the hand is detected and being switched off in the absence of the hand. Since the electric motor of the vacuum cleaner is switched on when a user of the vacuum cleaner holds the grip forming part of the suction tube and is switched off when a user of the vacuum cleaner releases the grip forming part of the suction tube the optical unit, which forms part of the remote control circuit, improves the ease of operation of the vacuum cleaner.

A drawback of the known vacuum cleaner is that the optical unit forming part of the remote control circuit is susceptible to faults.

SUMMARY OF THE INVENTION

It is an object of the invention to provide a remote control circuit accommodated in a suction tube, which remote control circuit does not have said drawback.

A vacuum cleaner in accordance with the invention is characterized in that the remote control circuit comprises a capacitive sensor for detecting the presence of a part of a human body in the proximity of the grip, which detection enables the electronic circuit to be controlled by the remote control circuit.

The invention is based primarily on the recognition of the fact that the susceptibility to faults of the prior-art vacuum cleaner results from the conditions under which a vacuum cleaner is used. Since a vacuum cleaner is generally used in a dusty space both the light-emitting part and the light-receiving part of the optical unit may be soiled, as a result of which the optical unit does not function (correctly). Moreover, as a user can utilize a vacuum cleaner at a variety of locations the light-receiving part may detect a stray light beam, in response to which detection the electric motor of the vacuum cleaner is switched off undesirably.

The invention is further based on the recognition of the fact that the remote control circuit comprising a capacitive sensor is immune to the above conditions, the hand of the user giving rise to a capacitance variation which is detected by the capacitive sensor and which cannot be disturbed by ambient conditions. Therefore, the capacitive sensor is particularly suitable for use in a remote control circuit accommodated in a suction tube of a vacuum cleaner.

An embodiment of a vacuum cleaner in accordance with the invention is characterized in that the electronic circuit comprises a signal processing circuit for processing a capacitance variation detected by the capacitive sensor. The capacitive sensor produces a capacitance variation as a result of the presence of a part of a human body (a hand) in the proximity of the grip and the signal processing unit serves for detecting this capacitance variation and for generating a control signal related to the capacitance variation.

Another embodiment of a vacuum cleaner in accordance with the invention is characterized in that the remote control circuit comprises a signal processing unit for processing a capacitance variation detected by the capacitive sensor. In the present embodiment the signal processing unit is incorporated in the remote control unit, which has the advantage that the signal processing unit is situated close to the source (capacitive sensor), which minimizes the susceptibility to faults.

A further embodiment of a vacuum cleaner in accordance with the invention is characterized in that the signal processing unit comprises a first oscillator having a capacitor constituted by the capacitive sensor and an output, a frequency-to-signal converter having an input coupled to the output of the first oscillator and having an output, and a first switching element having a control current path coupled to the output of the frequency-to-signal converter and having a main current path for carrying a control signal in dependence upon the capacitive sensor. In the present embodiment of a vacuum cleaner in accordance with the invention a capacitance variation of the capacitance formed by the capacitive sensor is converted into a frequency variation of an electric signal generated by the first oscillator, which frequency variation can be used advantageously for controlling the electronic circuit. For the purpose of controlling the electronic circuit the present embodiment comprises the frequency-to-signal converter, by means of which frequency-to-signal converter the frequency variation of the electric signal is converted into a control signal for the first switching element, on the basis of which control signal the switching element generates the control signal which is related to the capacitive sensor and which controls the electronic circuit.

A further embodiment of a vacuum cleaner in accordance with the invention is characterized in that the signal processing unit further comprises an indication element for generating a warning signal, which indication element is coupled in series with the main current path of the first switching element. The indication element of the vacuum cleaner in accordance with the invention has the advantage that it visually and/or audibly supports the control function of the electronic circuit.

A further embodiment of a vacuum cleaner in accordance with the invention is characterized in that the signal processing unit further comprises a second oscillator having a capacitor and an output, and a second switching element having a control current path coupled to the output of the second oscillator and having a main current path coupled in parallel with the main current path of the first switching element. By means of the capacitor the second oscillator generates an electric signal, by means of which electric signal the second switching element is continually switched on/off. Thus, when the first switching element is in the off-state the indication element, which is coupled in series with the main current paths of the switching elements, will be turned on/off by the second switching element to signal to a user of the vacuum cleaner that the appliance is in a standby mode. Conversely, when the first switching element is in the on-state the first switching element will turn on the indication element to signal to a user of the vacuum cleaner that the appliance is in an operating mode.

In conformity with the invention described above a suction tube in accordance with the invention may be characterized in that the remote control circuit comprises a capacitive sensor for detecting the presence of a part of a human body in the proximity of the grip, which detection enables the electronic circuit to be controlled by the remote control circuit.

An embodiment of a suction tube may be characterized in that the remote control circuit comprises a signal processing unit as used in the embodiments described above.

BRIEF DESCRIPTION OF THE DRAWINGS

The above and other (more detailed) features of the invention will be described more elaborately with reference to the accompanying drawings, in which.

DETAILED DESCRIPTION OF THE PREFERRED EMBODIMENTS

Figure 1:
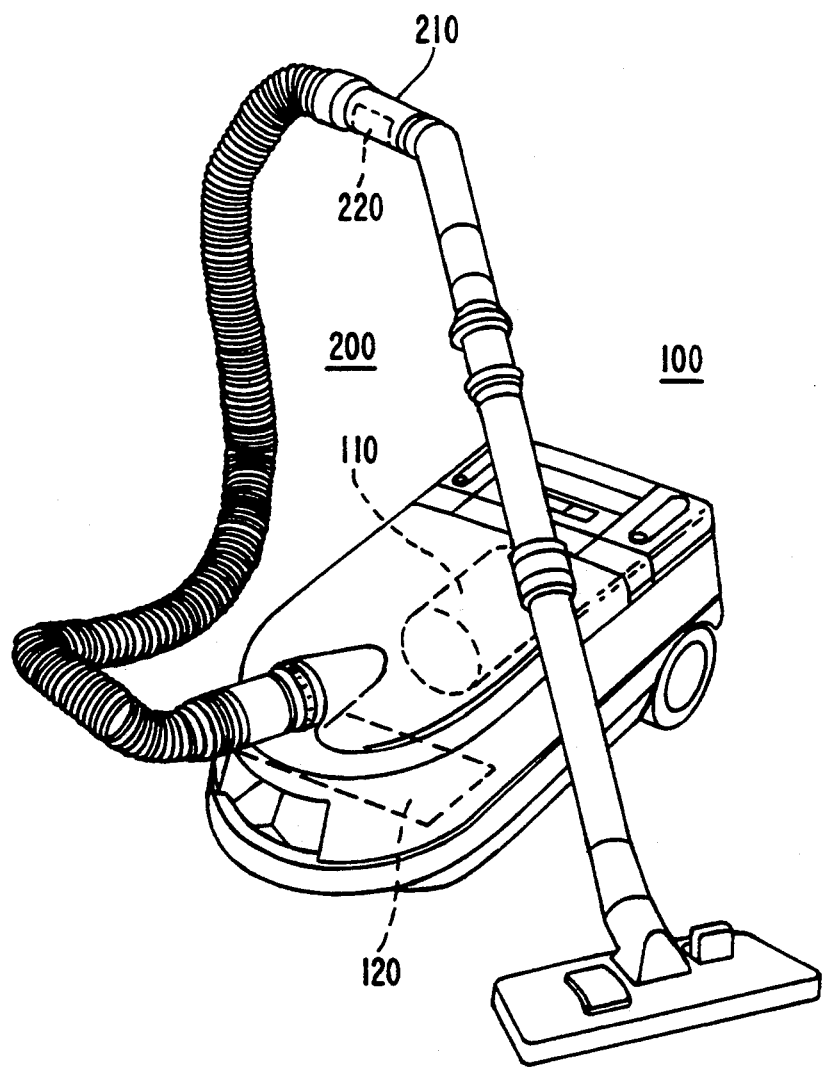
FIG. 1 shows an embodiment of a vacuum cleaner in accordance with the invention.

FIG. 1 shows an embodiment of a vacuum cleaner in accordance with the invention. The vacuum cleaner comprises a housing 100 accommodating an electric motor 110 and an electronic circuit 120 for controlling the electric motor 110, and a suction tube 200 which is connected to the housing 100 and which comprises a grip 210 with a remote control circuit 220 for controlling the electronic circuit 120, which remote control circuit 220 comprises a capacitive sensor (CS) and which electronic circuit 120 comprises, for example, a relay coupled in series with the electric motor 110 or a triac coupled in series with the electric motor 110. For controlling the electronic circuit 120 the suction tube 200 has been provided with electrical wiring which extends from the remote control circuit 220 to the housing 100 of the vacuum cleaner, the suction tube 200 and the housing 100 being coupled to one another by means of a coupling provided by electrical connectors. In the housing 100 wiring has been provided from the coupling to the electronic circuit 120 and the electric motor 110. Since the electric motor 110 of the vacuum cleaner is switched on/off by means of the capacitive sensor (CS) depending on the actual use of the vacuum cleaner, an increased safety and a reduced power consumption of the above vacuum cleaner are obtained.

It is to be noted that the vacuum cleaner described above, in an embodiment which differs from the present embodiment, may comprise wireless control means between the remote control circuit 220 and the electronic circuit 120.

Figure 2:
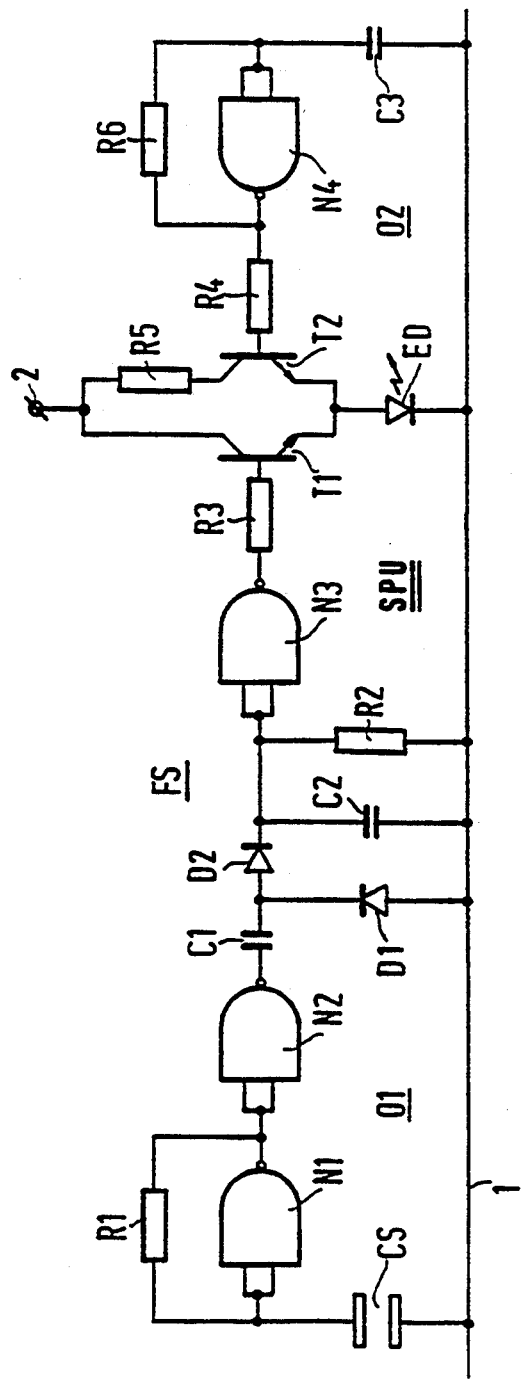
FIG. 2 shows a relevant part of a first embodiment of a vacuum cleaner in accordance with the invention.

FIG. 2 shows a relevant part of a first embodiment of a vacuum cleaner in accordance with the invention. The relevant part comprises a signal processing unit SPU adapted to process a capacitance variation detected by the capacitive sensor CS. In the present embodiment the signal processing unit SPU comprises an oscillator O1, a frequency-to-signal converter FS, a first switching element (R3, T1), a second oscillator O2, a second switching element (R4, T2, R5), and an indication element (ED), the oscillator O1 in accordance with the invention comprising a capacitive sensor CS for detecting a part of a human body in the proximity of the vacuum cleaner, on the basis of which detection the signal processing unit SPU can control the electronic circuit 120. Since the suction tube 200 of a vacuum cleaner is generally held by means of the grip 210 the capacitive sensor CS should be arranged near the grip for an optimum effect, which capacitive sensor CS can be constructed, for example, by means of a first capacitor plate formed by a foil arranged in or on the grip of the appliance, and a second capacitor plate coupled to a supply voltage terminal 1. Although the second capacitor plate, like the first capacitor plate, can be arranged in or on the grip, the second capacitor plate need not be physically present in the case of a mains-powered appliance. The reason for this is that when the capacitive sensor CS only comprises the first capacitor plate the first capacitor plate forms a capacitance relative to earth via a part of the body in the proximity of the appliance, which capacitance relative to earth is coupled to the supply voltage terminal 1 via the mains voltage and a power supply circuit provided in the vacuum cleaner. Whereas the capacitive sensor CS formed by means of the first capacitor plate has the advantage that the relevant sensor can be of a simple and cheap construction, the capacitive sensor CS, regardless of its construction, has the advantage in comparison with, for example, an optical or a resistive sensor, that the detection sensitivity of the capacitive sensor CS does not decrease when the capacitive sensor CS is soiled. In addition to the capacitive sensor CS the oscillator O1 comprises a NAND gate N1, a NAND-gate N2, and a resistor R1, the NAND-gate N1 having interconnected inputs coupled to the supply voltage terminal 1 by means of the capacitive sensor CS and having an output coupled to said inputs by a resistor R1, and the NAND-gate N2 having interconnected inputs coupled to the output of the NAND-gate N1 and having an output. The frequency-to-signal converter FS comprises a capacitor C1, a diode D1, a diode D2, a capacitor C2, a resistor R2, and a NAND-gate N3, the capacitor C1 and the diode D1 being coupled in series between the output of the NAND-gate N2 and the supply voltage terminal 1, the diode D2 and the capacitor C2 being coupled in series between the supply voltage terminal 1 and a point situated between the capacitor C1 and the diode D1, the resistor R2 being coupled in parallel with the capacitor C2, and the NAND-gate N3 having interconnected inputs, coupled to a point situated between the diode D2 and the capacitor C2, and having an output. The first switching element (R3, T1) comprises a transistor T1 having a base, a collector and an emitter, and a resistor R3, the base of the transistor T1 being coupled to the output of the NAND-gate N3 by means of the resistor R3. The second oscillator O2 comprises a NAND-gate N4, a capacitor C3, and a resistor R6, the NAND-gate N4 having interconnected inputs coupled to the supply voltage terminal 1 by means of the capacitor C3 and having an output coupled to said inputs by means of the resistor R6. The second switching element (R4, T2, R5) comprises a transistor T2 having a base, a collector and an emitter, a resistor R4 coupled between the output of the NAND-gate N4 and the base of the transistor T2, and a resistor R5 coupled between the collector of the transistor T2 and the collector of the transistor T1, the collector of the transistor T1 being coupled to an output current terminal 2, and the emitter of the transistor T2 being coupled to the emitter of the transistor T1, the emitter of the transistor T1 being coupled to the supply voltage terminal 1. In the present embodiment the indication element (ED) comprises a light-emitting diode ED coupled between the emitters of the transistors T1 and T2 and the supply voltage terminal 1. When the supply voltage terminal 1, for example, is connected to a first pole of a (direct) voltage source the NAND-gates (N1, N2, N3, N4) are energized from the supply voltage terminal 1 and from a supply voltage terminal coupled to a second pole of the (direct) voltage source. The oscillators O1 and O2 play a central role in the operation of the present embodiment.

Starting from a standby mode of the vacuum cleaner, in which standby mode the electric motor 110 of the vacuum cleaner is switched off, the oscillators O1 and O2, which are energized by the (direct) voltage source, will oscillate. The oscillator O1 generates an electric signal, which electric signal has a frequency related to a capacitance constituted by the capacitive sensor CS, the capacitive sensor being continually charged and discharged via the resistor R1 coupled across the NAND-gate N1. By means of the NAND-gate N2, which forms a buffer, the electric signal is applied to the frequency-to-signal converter FS, which converter converts the electric signal into a control signal. In the standby mode the control signal has such a value that the transistor does not conduct. Consequently, the capacitor C1 transfers the electric signal generated by the oscillator O1, after which the diodes D1 and D2 rectify the signal and the capacitor C2 provides a smoothed control signal. Similarly to the oscillator O1, the oscillator O2 generates an electric signal having a frequency related to a capacitance constituted by the capacitor C3, the capacitor being continually charged and discharged via the resistor R6 coupled across the NAND-gate N4. The electric signal generated by the oscillator O2 is applied to the base of the transistor T2, the transistor T2 being turned on/off continually in response to this electric signal. In the standby mode, when the transistor T1 is in the off-state, this turning on/off of the transistor T2 results in a current which causes the light-emitting diode ED to blink, the current limited by the resistor R5 not being suitable for driving the electronic circuit 120. The limited current is not necessary when the collector of the transistor T2 is coupled, for example, directly to the supply voltage terminal not shown.

Starting from the operating mode of the vacuum cleaner, in which mode the grip is held in a hand, the capacitance constituted by the capacitive sensor CS has a value which has changed relative to that in the standby mode, as a result of which the oscillator O1 generates an electric signal of reduced frequency which differs from that in the standby mode. In the same way as in the standby mode the electric signal is applied to the frequency-to-signal converter FS, which converter converts the electric signal into a control signal. In the operating mode the control signal has such a value that the transistor T1 conducts. Consequently, the capacitor C1 blocks the electric signal generated by the oscillator O1, the resistor R2 ensuring that the capacitor C2 is discharged rapidly. As a result of the conduction a current (i.e. a control signal) flows through the transistor T1, which current causes the light-emitting diode ED to light up, the current being suitable for driving the electronic circuit 120. Although in the present embodiment the light-emitting diode ED has been arranged between the emitters of the transistors T1 and T2 and the supply voltage terminal 1, the light-emitting diode ED can be arranged at several other locations, for example only in series with one of the main current paths of the transistors T1 and T2.

Figure 3:
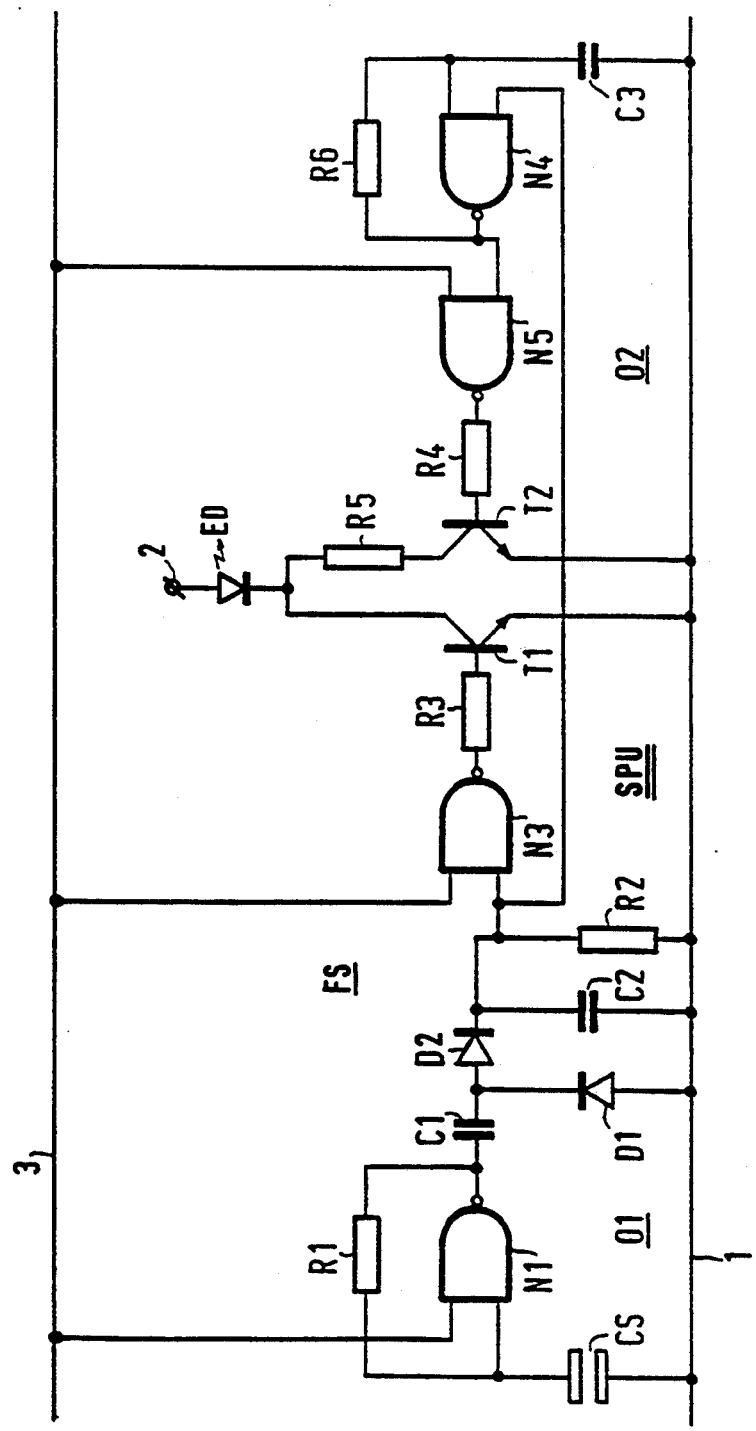
FIG. 3 shows a relevant part of a second embodiment of a vacuum cleaner in accordance with the invention.

FIG. 3 shows the relevant part of a second embodiment of the vacuum cleaner in accordance with the invention. The relevant part differs from the embodiment shown in FIG. 1 as regards a number of features, which features serve to illustrate a multiplicity of possible versions of signal processing unit SPU. A first feature is that the NAND-gate N2 has been dispensed with and a NAND-gate N5 has been added. The NAND-gate N5 has a first input coupled to the output of the NAND-gate N4, has a second input coupled to the supply voltage terminal 3 coupled to the second pole of the (direct) voltage source, and has an output coupled to the base of the transistor T2 by means of the resistor R4. Similarly to the NAND-gates N2 and N3 shown in FIG. 2 the NAND-gate N5 has a buffer function. Suitably, the NAND-gates (FIGS. 1 and 2) are constructed as a single integrated circuit. A second feature concerns the NAND-gates N1 and N3, which NAND-gates in the same way as the NAND-gate N5 have an input coupled to the supply voltage terminal 3. Since each of the NAND-gates shown in FIGS. 1 and 2 is arranged as an inverter the inputs which are not essential for the operation may be coupled both to one another and to the supply voltage terminal 3. A third feature is that the indication element formed by the light-emitting diode ED has been transferred to another location. In the present embodiment the light-emitting diode ED has been coupled between the output current terminal 2 and the parallel arrangement of the main current paths of the transistors T1 and T2. A fourth feature concerns the NAND-gate N4, which NAND-gate has an input coupled to the point situated between the diode D2 and the capacitor C2. Since the input of the NAND-gate N4 has been coupled to the relevant point the oscillator O2 is disabled when the transistor T1 is turned on.

The invention is not limited to the embodiments shown herein. Within the scope of the invention several modifications are conceivable to the expert. For example, the signal processing unit can be constructed in many ways differing from the embodiments shown. The essential feature of the signal processing unit is that a capacitance variation of the capacitive sensor is detected and results in a control signal suitable for driving the electronic circuit. With regard to the embodiments shown it is to be noted that the oscillators, the frequency-to-signal converter, the switching elements and the indication element can be constructed in many other ways than shown. For example, the indication element can be constructed by means of a lamp or a sound reproducer and the indication element may readily be arranged at another location in the signal processing unit. Another possibility is to implement the indication element by means of two light-emitting diodes, for example light-emitting diodes which each have a different colour, which light-emitting diodes can be coupled, for example, in series with the respective main current paths of the switching elements. A further possibility is to implement the indication element by means of a light-emitting diode and a sound reproducer, which may be helpful, for example, for deaf and for blind persons.

We claim:

1. A vacuum cleaner comprising a housing (100) provided with an electric motor (110) and with an electronic circuit (120) for controlling the electric motor (110), and a suction tube (200) coupled to the housing (100) and comprising a grip (210) with a remote control circuit (220) for controlling the electronic circuit (120), at least one of said electronic circuit (120) and said remote control circuit (220) comprising a signal processing unit (SPU), wherein the remote control circuit (220) comprises a capacitive sensor (CS) for detecting the presence of a part of a human body in the proximity of the grip (210), said presence of a part of the human body giving rise to a capacitance variation which is detected by the capacitive sensor (CS), which detection enables the signal processing unit (SPU) to process a control signal related to the capacitance variation detected and the electronic circuit (120) to be controlled by the remote control circuit (220).

2. A vacuum cleaner as claimed in claim 1, wherein the electronic circuit (120) comprises a signal processing unit (SPU) for processing a capacitance variation detected by the capacitive sensor (CS).

3. A vacuum cleaner as claimed in claim 1, wherein the remote control circuit (220) comprises a signal processing unit (SPU) for processing a capacitance variation detected by the capacitive sensor (CS).

4. A suction tube for use with a vacuum cleaner comprising a housing (100) provided with an electric motor (110) and with an electronic circuit (120) for controlling the electric motor (110), which suction tube (200) comprises a grip (210) with a remote control circuit (220) for controlling the electronic circuit (120), at least one of said electronic circuit (120) and said remote control circuit (220) comprising a signal processing unit (SPU), wherein the remote control circuit (220) comprises a capacitive sensor (CS) for detecting the presence of a part of a human body in the proximity of the grip (210), said presence of a part of the human body giving rise to a capacitance variation which is detected by the capacitive sensor (CS), which detection enables the signal processing unit (SPU) to process a control signal related to the capacitance variation detected and the electronic circuit (120) to be controlled by the remote control circuit (220).

5. A suction tube as claimed in claim 4, characterised in that the remote control circuit (220) comprises a signal processing unit (SPU) for processing a capacitance variation detected by the capacitive sensor (CS).

6. A vacuum cleaner comprising a housing (100) provided with an electric motor (110) and with an electronic circuit (120) for controlling the electric motor (110), and a suction tube (200) coupled to the housing (100) and comprising a grip (210) with a remote control circuit (220) for controlling the electronic circuit (120), at least one of said electronic circuit (120) and said remote control circuit (220) comprising a signal processing unit (SPU), wherein the remote control circuit (220) comprises a capacitive sensor (CS) for detecting the presence of a part of a human body in the proximity of the grip (210), said presence of a part of the human body giving rise to a capacitance variation which is detected by the capacitance sensor (CS), which detection enables the signal processing unit (SPU) to process a control signal related to the capacitance variation detected and the electronic circuit (120) to be controlled by the remote control circuit (220), the signal processing unit (SPU) comprising a first oscillator (O1) having a capacitor constituted by the capacitive sensor (CS) and an output, a frequency-to-signal converter (C1, D1, D2, C2, R2, N3) having an input coupled to the output of the first oscillator (O1) and having an output, and a first switching element (R3, T1) having a control current path coupled to the output of the frequency-to-signal converter (C1, D1, D2, C2, R2, N3) and having a main current path for carrying a control signal in dependence upon the capacitive sensor (CS).

7. A vacuum cleaner as claimed in claim 6, wherein the signal processing unit (SPU) further comprises an indication element (ED) for generating a warning signal, which indication element (ED) is coupled in series with the main current path of the first switching element (R3, T1).

8. A vacuum cleaner as claimed in claim 6, wherein the signal processing unit (SPU) further comprises a second oscillator (O2) having a capacitor (C3) and an output, and a second switching element (R4, T2, R5) having a control current path coupled to the output of the second oscillator (O2) and having a main current path coupled in parallel with the main current path of the first switching element (R3, T1).

9. A vacuum cleaner as claimed in claim 7 wherein the signal processing unit (SPU) further comprises a second oscillator (O2) having a capacitor (C3) and an output, and a second switching element (R4, T2, R5) having a control current path coupled to the output of the second oscillator (O2) and having a main current path coupled in parallel with the main current path of the first switching element (R3, T1).

10. A suction tube for use with a vacuum cleaner comprising a housing (100) provided with an electric motor (110) and with an electronic circuit (120) for controlling the electric motor (110), which suction tube (200) comprises a grip (210) with a remote control circuit (220) for controlling the electronic circuit (120), at least one of said electronic circuit (120) and said remote control circuit (220) comprising a signal processing unit (SPU), wherein the remote control circuit (220) comprises a capacitive sensor (CS) for detecting the presence of a part of a human body in the proximity of the grip (210), said presence of a part of the human body giving rise to a capacitance variation which is detected by the capacitive sensor (CS), which detection enables the signal processing unit (SPU) electronic circuit (120) to process a control signal related to the capacitance variation detected and the to be controlled by the remote control circuit (220), the signal processing unit (SPU) comprising a first oscillator (O1) having a capacitor constituted by the capacitive sensor (CS) and an output, a frequency-to-signal converter (C1, D1, D2, C2, R2, N3) having an input coupled to the output of the first oscillator (O1) and having an output, and a first switching element (R3, T1) having a control current path coupled to the output of the frequency-to-signal converter (C1, D1, D2, C2, R2, N3) and having a main current path for carrying a control signal in dependence upon the capacitive sensor (CS).

11. A suction tube as claimed in claim 10 wherein the signal processing unit (SPU) further comprises an indication element (ED) for generating a warning signal, which indication element (ED) is coupled in series with the main current path of the first switching element (R3, T1).

12. A suction tube as claimed in claim 10 wherein the signal processing unit (SPU) further comprises a second oscillator (O2) having a capacitor (C3) and an output, and a second switching element (R4, T2, T5) having a control current path coupled to the output of the second oscillator (O2) and having a main current path coupled in parallel with the main current path of the first switching element (R3, T1).

* * * * *